United States Patent [19]
Shishkin et al.

[11] Patent Number: 4,818,298
[45] Date of Patent: Apr. 4, 1989

[54] METHOD OF REMOVING DEPOSITS FROM THE INSIDE WALLS OF A PIPELINE AND APPLYING PROTECTIVE COATINGS THERETO

[75] Inventors: Viktor V. Shishkin; Dmitry N. Cherebedov; Nikolai F. Kryazhevskikh; Valery P. Panchenko, all of Krasnodar; Yaroslav P. Sushkov, Eisk; Evgeny G. Lukin, Alma-Ata; Petr G. Sokol, Krasnodar; Alexandr I. Chernyai, Alma-Ata; Viktoria I. Kapralova, Alma-Ata; Lidia S. Sulekova, Alma-Ata, all of U.S.S.R.

[73] Assignee: Trest "Juzhvodoprovod", Krasnodar, U.S.S.R.

[21] Appl. No.: 56,486
[22] PCT Filed: Aug. 16, 1985
[86] PCT No.: PCT/SU85/00070
 § 371 Date: Apr. 9, 1987
 § 102(e) Date: Apr. 9, 1987
[87] PCT Pub. No.: WO87/01058
 PCT Pub. Date: Feb. 26, 1987

[51] Int. Cl.$^4$ .......................... B08B 3/02; B08B 9/02
[52] U.S. Cl. .......................... 134/22.11; 134/22.12; 134/22.13; 134/22.14; 134/24; 134/26; 134/29

[58] Field of Search ............... 134/22.12, 22.11, 22.13, 134/22.14, 24, 29, 26

[56] References Cited

U.S. PATENT DOCUMENTS

| | | | |
|---|---|---|---|
| 3,973,056 | 8/1976 | Fessler et al. | 427/136 |
| 4,451,296 | 5/1984 | Barabas | 134/4 |
| 4,645,542 | 2/1987 | Scharton et al. | 134/22.12 |

Primary Examiner—Asok Pal
Attorney, Agent, or Firm—Lilling & Greenspan

[57] ABSTRACT

A method of removing deposits from the inside surface of a pipeline and applying a protective coating thereto includes cleaning the pipeline inside surface and treating this surface with a solution of corrosion inhibitor to form a coating on the pipeline inside surface followed by a subsequent treatment with a solution of corrosion inhibitor to maintain the strength of the coating thus applied. The method provides for cleaning of the inside surface by jets of liquid which produce a pressure differential between the core of deposits and their surface to separate the deposits from the pipeline walls, while simultaneously impregnating the remaining layer of deposits with a solution of corrosion-promoting agent and subsequently impregnating the layer with a solution of corrosion inhibitor to form a coating.

15 Claims, No Drawings

METHOD OF REMOVING DEPOSITS FROM THE INSIDE WALLS OF A PIPELINE AND APPLYING PROTECTIVE COATINGS THERETO

BACKGROUND OF THE INVENTION

1. Field of the Invention

This invention relates to the practice of operating main and distribution networks of pressure and gravity flow steel pipelines. More particularly, it concerns a method of protecting the inside surface of a pipeline from deposits and applying a protective coating thereto.

2. Description of the Invention

The prior art knows a range of methods for cleaning the inside of pipelines or removing depsits therefrom. However, while solving the problem of pipe cleaning, these fail to provide reliable protection of the pipeline inside walls from corrosion along with cleaning.

For example, there is known a method of cleaning pipeline interior accompanied by protecting the inside walls of the pipeline from subsequent contamination in which a protective layer is formed in the course of cleaning by removing excessive deposits and compacting the remaining deposit layer with all the pipeline improvement operations executed mechanically (cf., USSR Inventor's Certificate No. 1.018,729, IPC B 08 17/00, published 1982). However, this method fails to prevent pitting which affects the pipeline surface, because pits remain in the thus compacted layer.

Widely popular is a hydromechanical method of removing deposits from the interior of pipelines, which resides in that a self-contained pipe-cleaning unit is moved along the pipeline under a liquid overpressure, whereby part of the liquid passed through this unit acts to entrain the deposits scrubbed away from the pipeline walls (cf., USSR Inventor's Certificate No. 856,599, IPC B 08 B 9/04; and USSR Inventor's Certificate No. 716,647, IPC B 08 B 9/04, published 1976).

Although this method ensured inside pipe wall cleaning to the pipe metal, the extent to which pipe deposits are removed is not sufficient for applying a corrosion-resistant coating, because pits and flaws of the pipe inside surface retain some corrosive deposits conductive to subsequent pitting. Also, another disadvantage of the method includes the susceptibility of the freshly cleaned and unprotected metal surface of the pipe to vigorous corrosion, while pipe thickness reduces due to the loss of metal.

Provision of a protective layer on the pipe surface cleaned from deposits is possible in a number of ways. There is known, for example, a method of treating such cleaned pipe surface for a period of six days by a solution of corrosion inhibitor composed of a high concentration sodium polyphosphate (75 mg/l in terms of $P_2O_5$), after which the thus formed coating is continuously replenished with a weaker solution of sodium polyphosphate (5 mg/l $P_2O_5$) (cf., Klyachko V.A. and Apeltsin I.E. "Ochistka prirodnykh yod"—Natural Water Purification, in Russian, the "Stroiizdat" Publishers, 1971, pp. 507 to 512).

However, such inhibitor fails to protect drinking water pipelines from corrosion, since the amount of sodium polyphosphate continuously added to the flow of liquid carried by the p peline exceeds that prescribed for drinking water. Conversely, without continuously adding the inhibitor the coating exhibits signs of rapid wear. Otherwise stated, it is necessary that a definite ratio between the contents of calcium and sodium polyphosphate be maintained throughout pipeline operation, or the sodium polyphosphate promote corrosion.

In view of the aforedescribed, none of the known methods of chemically protecting a pipeline from corrosion provides reliable and long-lasting coatings.

SUMMARY OF THE INVENTION

It is therefore a principle object of the present invention to provide a method for simultaneously removing deposits from the inner surface of a pipeline and applying a protective coating thereto which would feature high strength and long service life.

The objects and attending advantages of the invention are attained by that in a method of removing deposits from the inside surface of a pipeline and applying a protective coating thereto in which this surface is cleaned from the deposits and treated with a solution of corrosion inhibitor to form a coating thereon accompanied by a subsequent application of corrosion inhibitor to maintain the coating, acording to the invention, the inside surface of the pipeline is cleaned by fluid jets producing a pressure differential between the core of the deposits and their surface to thereby remove most of the deposit layer, the remaining layer of deposits being simultaneously impregnated with a solution of corrosion inhibitor contained in the cleaning fluid to form a coating, or with a corrosion-promoting solution followed by a subsequent treatment of the layer with a corrosion inhibitor to form a protective coating.

Preferably, the pressure differential ranges from 0.2 to 1.25 MPa.

The jets of liquid which produce the pressure differential between the core of the deposits and their surface within a range of from 0.2 to 1.25 MPa act to remove most of the deposits leaving on the pipeline inside walls the hardest and difficulty soluble corrosion products of high adhesive capacity (normallly a layer of deposits 1 to 5 mm thick). Therewith, by virtue of the pressure differential, slimy products of corrosion are evacuated from pits and pin-holes of the deposit for these pits and pin-holes to be immediately filled with the solution of corrosion inhibitor and form a safe protective layer through chemical reactions with the substances making up the deposits bridging the deposit pores.

The aforedescribed cleaning process does not envisage exposure of or damage to the metal of the inside pipeline surface, whereas the remaining deposits form on this surface by means of the corrosion inhibitor a strong and durable protective layer.

Prior to cleaning the inner surface of the pipeline is advisably treated with an agent capable of reducing the mechanical strength of the corrosion products, such as a water solution of chlorine of 5 mg/l concentration, or an aqueous solution of aluminum sulphate of 20 mg/l concentration. This promotes corrosion processes which cause the deposits to separate into layers and facilitate cleaning. In addition, excessive amount of iron ions formed in the deposits enter into reaction with the corrosion inhibitor accompanied by the formation of hard-to-dissolve compounds.

Advisably, before cleaning the inner surface of the pipeline is treated with a rust convertering, agent such as a polyvinyl acetate dispersion or a methylvinylcerasin latex. This is accompanied by improved adhesion of the deposits to the pipeline wall to form a layer having a multitude of pin-holes which are thereafter filled with various inhibitors. Used as the corrosion inhibitor solution is preferably an aqueous solution of aluminum alloy of the following composition, in wt. per cent: magnesium 0.1 -1.0, gallium 0.1 -3.5, aluminum - the balance; or an aqueous solution of sodium polyphosphate, sodium silicate and phosphoric acid taken in a ratio of 2:1:1, respectively; or, alternatively, an aqueous solution of sodium and polyphosphate and silicate in the ratio of 10:1, or an aqueous solution, of cement. These solutions of corrosion inhibitor tend to form with the elements present in the deposits and water compounds capable of a sudden increase in the volume to thereby fill the pores and pin-holes of the remaining deposit and ensure the formation of a protective layer of high density.

Used as the solution which promotes corrosion is preferably a solution of chlorine, phosphoric acid or aluminum sulphate. Impregnation of the remaining layer of deposits with the corrosion-promoting solution facilitates evacuation of slimy products of corrosion from pits and pin-holes exposed during cleaning.

During cleaning the inner surface of the pipline it is advisable to introduce to the jets of cleaning liquid polyacrylamide in the amount of 2 to 100 mg/l.

Addition of polyacrylamide to the jets of cleaning liquid enhances the hydrodynamic effect exerted thereby on the deposits and ensures a lower pressure of water in the pipeline being cleaned, which in turn makes it possible extend the length of pipeline cleaned within one pass, as well as to clean pipes of small diameter (to 100 mm) not subject to cleaning by the prior art techniques, since such cleaning requires a pressure of liquid exceeding the strength of pipe materials.

Cleaning the interior of the pipeline and impregnating the remaining layer of the deposits by a corrosion inhibitor, or by an agent promoting corrosion with subsequent treatment of the remaining deposit with a corrosion inhibitor to form a protective coating are preferably carried out in an electric field induced at the surface of the pipeline and movable therealong in step with the portions of the pipeline being cleaned and impregnated.

The provision of the electric current at the surface of the pipeline where it is being cleaned and impregnated makes the process of the protective coating formation more vigorous on the one hand through electroactivation of water and increase in the concentration of the $OH^-$ ions in the thin layer of coating formation, and on the other through facilitating the processes of electrophoretic precipitation of calcium, magnesium, and aluminum either present in the natural water of specifically added thereto to form chemically stable hydrate bonds with iron.

Advisably, used as the solution of corrosion inhibitor preserving the protective coating is a water solution of sodium polyphosphate of not more than 3 mg/l in concentration, or a mixture thereof with ammonia or carbon dioxide, the sodium polyphosphate being preferably subjected to partial depolymerization resulting in the formation of polycompounds with not more than 6 atoms of phosphorus, the treatment with such a solution of corrosion inhibitor proceeding until the iron content in water at the outlet from the pipeline amounts to between 0.1 and 0.15 mg/l. The treatment with the solution of corrosion inhibitor promotes the formation of hard-to-dissolve compounds in the protective coating. The mechanism of formation of the above compounds resides in that in the presence in water of small amounts of sodium polyphosphate the latter tends to undergo to hydrolysis accompanied by the formation of orthophosphate-ions which form difficulty soluble compounds with the iron ions. Addition to the solution of ammonia or carbon dioxide, while promoting corrosion, increases the amount of iron ions necessary for the coating formation. Partial depolymerization of sodium polyphosphate provides sufficiency of orthophosphate-ions for the reactions. In order to maintain (replenish) the thus formed protective layer on the pipeline, use is made of a sodium polyphosphate solution of not over 3 mg/l in concentration, which is not in excess of the amount specified for drinking water, whereby its use for chemically protections drinking water pipelines becomes advantageous. The treatment of the pipeline with low concentration inhibitors results in products of reaction of sodium polyphosphate with iron rather than with calcium.

Thanks to the formation of difficulty soluble compounds in the course of replenishing the protective coating, the latter progressively grows in strength, and subsequent to terminating the replenishing operation (viz., at iron content in the water of 0.1 to 0.15 mg/l) it becomes strong enough to last up to 2 years of continuous service or even longer.

DESCRIPTION OF THE PREFERRED EMBODIMENT

The proposed method is carried out in the following manner.

A pipe cleaning unit is installed in the interior of the pipeline for simultaneously cleaning the inner surface of the pipe and forming a protective coating thereon.

The inner surface of the pipeline is cleaned by jets of liquid producing a pressure differential between the core of deposits formed on the pipe and the surface of such deposits, this pressure differential preferably ranging between 0.2 and 1.25 MPa. Thanks to the pressure differential, the deposits are partially separated from the surface being cleaned to leave on the walls a layer of substantially solid deposits. Slimy products of corrosion are then evacuated from pores and pin-holes of the remaining deposits. Simultaneously, these pores and pin-holes are occupied by corrosion inhibitor carried by the liquid jets for the inhibitor to enter into reaction with the deposition products and reagents present in water and form difficulty soluble compounds which reliably bridge the pores and pin-holes thus providing a corrosion-resistant coating. Prior to cleaning the interior of the pipeline and forming the protective coating, the inside pipe walls can be treated with a chemical composition capable of reducing mechanical strength of deposits and their capacity to adhere to the walls of the pipeline.

Preferably, used as such a composition is an aqueous solution of chlorine of 5 mg/l concentration, or an aqueous solution of aluminum sulphate of 20 mg/l concentration. The thus reduced mechanical strength of the deposits produces a less damaging effect on the pipe metal structure to result in an increased corrosion resistance. To ensure that the protective coatings last longer, prior to cleaning and forming the coatings the inside surface of the pipeline is treated with a rust converting agent, such as a polyvinyl acetate dispersion, or a dispersion of methylvinylcerasin latex.

Such a procedure improves adhesion of the deposits to the walls of the pipeline to form a layer of deposits with a multitude of pits and pin-holes thereafter occupied by corrosion inhibitors.

Advisably, used as the corrosion inhibitors are: an aqueous solution of aluminum alloy of the following composition, in wt. percent—magnesium 0.1 to 1.0, gallium 0.1 to 3.5, aluminum—the balance; or an aqueous solution of sodium polyphosphate, sodium silicate and phosphoric acid taken in a ratio of 2:1:1, respectively; or an aqueous solution of sodium polyphosphate and silicate in the ratio of 10:1; or an aqueous solution of cement.

To facilitate the evacuation of slimy products of corrosion from the pits and pin-holes exposed after cleaning, it is advisable that prior to impregnating the remaining deposit layer by inhibitors this layer should be treated with a corrosion-promoting agent, such as an aqueous solution of chlorine, phosphoric acid or aluminum sulphate.

Desirably, in order to enhance the hydrodynamic effect of the jets of cleaning liquid on the deposits accumulated on the pipeline surface, polyacrilamide in the amount of 2 to 100 mg/l is added to the liquid jets, whereby it becomes possible to reduce the pressure of water in the pipeline.

For improving the quality of the protective coating and extending its service life 1.5 to 2 times, it is recommended that the inhibitor be introduced to the pits and pin-holes of the deposits by way of an electric field in which ions and molecules of the inhibitor are activated to form compounds mainly with iron ions, whereby the amount of the inhibitor to be consumed is reduced, since the ions of the inhibitor penetrate more vigorously into the pits and pores of the deposits. Therewith, orthophosphate compounds with iron ions are formed without the formation of intermediate compounds. In order to provide a more reliable protective coating and make the pipeline more resistant to corrosion, before introducing sodium polyphosphate to the pipeline the latter should preferably be subjected to partial depolymerization accompanied by the formation of polycompounds with not more than 6 atoms of phosphorus.

Subsequent to cleaning of the pipeline and applying a protective coating thereto, or during the regular operation of the pipeline in response to an increase in the amount of iron contained in the water being pumped through the pipeline to over 0.2 mg/l, the protective coating must be treated with an inhibitor, desirably an aqueous solution of sodium polyphosphate of not more than 3 mg/l concentration, or a mixture thereof with ammonia, carbon dioxide, or sodium silicate, such a treatment proceeding until iron content in the water at the outlet from the pipeline is brought down between 0.1 and 0.15 mg/l.

The proposed method enables simultaneous cleaning of the corroded pipelines application of a protective coating to the inside surface thereof which could be strong enough to last for at least 3 to 5 years. To restore the properties of the protective coating, only a negligible amount of inhibitor is required, particularly 4 to 6 times less than for the prior art methods.

The invention will be more fully understood with reference to various examples of the proposed method that follow.

EXAMPLE 1

A drinking water pipeline 500 mm in diameter and 100k long for 10 years is cleaned by removing deposits. The inside walls of the pipeline exhibit a continuous layer of deposits 20 to 35 mm in thickness. Iron content at the pipeline outlet is 180 mg/l.

A cleaning unit is mounted into the pipeline through a special chamber, after which an aqueous solution of corrosion inhibitor, viz., sodium polyphosphate having a concentration of 50 mg/l in terms of $P_2O_5$, is pumped into the pipeline interior to remove the deposits and form a protective coating by impregnating the layer of deposits remaining after cleaning.

Secured at the top part of the pipeline in a space formed between the pipe wall and the layer of deposits developed thereon at intervals of each 1 km of the pipeline length are piezoelectric elements to monitor pressure in the deposits.

Subsequent to cleaning a pipeline length of 25 km the delivery of the inhibitor is terminated and only water is pumped to the pipeline. By monitoring the pressure of the aqueous solution of inhibitor or water in the interior of the pipeline downstream of the cleaning unit, the pressure in the deposits and thereabove is varied within a range of from 0.2 to 1.25 MPa (for comparison, a pressure range of 0.1 to 1.3 MPa was tried). The pressure in the deposits and thereabove is varied by subjecting the deposits to the action of liquid jets escaping from the cleaning unit.

After the cleaning unit reaches the receiving chamber, it is recovered from the pipeline and pressure is metered at the piezoelectric elements. The pipeline is then cured for 6 hours with the remaining inhibitor, after which it is flushed to a concentration of sodium polyphosphate 3.5 mg/l in terms of $P_2O_5$.

Water containing 1 mg/l of sodium polyphosphate is conveyed along the pipeline to the consumer.

Daily measurements of the amount of iron dissolved in the water are taken at the pipeline terminal.

After 1.5 years of the pipeline operation the content of dissolved iron in the water amounts to 1.1–0.15 mg/l.

The addition of inhibitor to the pipeline is stopped.

Samples of the pipeline wall are cut at points where the piezoelectric elements are secured.

Non-working surfaces of the samples are coated with a protective mastic. The samples are placed in a test stand through which drinking water is conveyed at a speed of 5 m/s. The rate of steel corrosion in mm per year is determined according to kinetic curves, whereas the rate of iron ions transfer to the water is determined by pipeline surface coloration.

TABLE 1

| Pressure differential in deposits during cleaning and applying a protective coating in MPa | Rate of sample corrosion in mm/yr | Service life of the coating, days | Visual features of the surface being protected |
|---|---|---|---|
| 2 | 3 | 4 | 5 |
| 0.1 | 0.5 | 24 | The surface has a porous layer of deposits 8 to 10 mm thick |
| 0.2 | 0.2 | 180 | The surface has a dense layer of deposits, light brown in color, 3 to 5 mm thick |
| 0.3–1.25 | 0.15–0.05 | 250 | The surface has a layer of deposits dark brown in color |
| 1.3 | 0.3 | 680 40 | The surface has a film of dark color. Deposits are completely removed from the inner wall of the pipeline even from the pores and pits |

TABLE 1-continued

| Pressure differential in deposits during cleaning and applying a protective coating in MPa | Rate of sample corrosion in mm/yr | Service life of the coating, days | Visual features of the surface being protected |
|---|---|---|---|
| 1 | 2 | 3 | 4 |
|   |   |   | of the metal surface |

EXAMPLE 2

A pipeline is cleaned and protected from corrosion in a manner substantially similar to one described in Example 1.

Prior to starting the cleaning unit water containing chlorine in the amount of 5 mg/l is pumped through the pipeline.

All stages of cleaning and coating application are carried out at an optimum pressure differential of 0.8 MPa in the deposits and thereabove.

Samples are tested as described in Example 1.

Results of tests are represented in Table 2.

TABLE 2

| Example No. | Rate of corrosion of the samples, in mm/yr | Life of the protective coating, days |
|---|---|---|
| 2 | 0.09 | 600 |
| 3 | 0.08 | 650 |
| 4 | 0.06 | 720 |

EXAMPLE 3

A pipeline is cleaned, coated, and samples are subjected to corrosion tests substantially as described in Example 1.

Prior to cleaning the pipeline is treated with an aqueous solution of aluminum sulphate in the amount 20 mg/l in terms of $1^{+++}$.

Pressure differential in the deposits and thereabove is 0.8 MPa.

Test results are represented in Table 2.

EXAMPLE 4

A pipeline is cleaned, coated, and samples are subjected to corrosion tests substantially as described in Example 1.

Prior to cleaning the pipeline is treated with an aqueous solution of polyvinylacetate dispersion 50 mg/l in concentration.

Pressure differential in the deposits and thereabove is 0.8 MPa.

Test results are represented in Table 2.

EXAMPLE 5

A pipeline is cleaned, a protective coating is applied and samples are tested substantially as described in Example 1.

Used as the inhibitor forming the coating is an aqueous solution of aluminum alloy of the following composition, in wt. percent:
magnesium—0.5
gallium—3.0
aluminum—the balance.

Aluminum content in the solution is 40 mg/l in terms of $Al^{+++}$. Pressure differential is 0.8 MPa.

Results of sample tests are represented in Table 3.

EXAMPLE 6

A pipeline is cleaned, a protective coating is applied, and samples are tested as described in Example 1.

Used as the inhibitor forming the coating is an aqueous solution of sodium polyphosphate, sodium silicate and phosphoric acid taken in a ratio of 2:1:1, respectively.

Concentration of sodium polyphosphate in the water solution is 30 mg/l in terms of $P_2O_5$.

Pressure differential in the deposits is 0.8 MPa.

Results of sample tests are represented in Table 3.

EXAMPLE 7

A pipeline is cleaned, a protective coating is applied and samples are tested for corrosion as described in Example 1.

Used as the inhibitor forming the protective coating is an aqueous solution of sodium polyphosphate and sodium silicate in a ratio 10:1.

Concentration of sodium polyphosphate in the solution is 25 mg/l in terms of $P_2O_5$.

A pressure differential of 0.8 MPa is produced in the deposits.

Test results of samples are represented in Table 3.

EXAMPLE 8

A pipeline is cleaned, a protective coating is applied, and samples are tested as described in Example 1.

Used as the inhibitor forming the coating in a solution of Portland cement of 30 g/l in concentration.

A pressure differential of 0.8 MPa is produced in the deposits.

Results of sample tests are represented in Table 3.

TABLE 3

| Example No. | Rate of corrosion formation in samples, mm/yr | Life of the protective coating, days |
|---|---|---|
| 5 | 0.05 | 850 |
| 6 | 0.05 | 790 |
| 7 | 0.07 | 750 |
| 8 | 0.08 | 910 |

EXAMPLE 9

A pipeline is cleaned, a protective coating is applied, and samples are tested as described in Example 1.

Prior to the installation of the cleaning device, a similar device is first placed in the pipeline, and the pipeline interior between the devices is filled with a corrosion promoter, such as an aqueous solution of chlorine 7 mg/l in concentration.

15 km of pipeline length is occupied by the solution.

A pressure difference of 0.8 MPa is produced in the deposits.

Results of sample tests are represented in Table 4.

EXAMPLE 10

A pipeline is cleaned, a protective coating is applied, and samples are tested as described in Example 1.

Additionally, prior to mounting the cleaning device in the pipeline a second such device is placed in the pipeline, and the space between the devices is filled with a corrosion promoter, such as an aqueous solution of aluminum sulphate of 25 mg/l concentration in terms of $Al^{+++}$. 20 km of pipeline length is filled with this solution.

A pressure differential of 0.8 MPa is produced in the deposits.

Test results are represented in Table 4.

EXAMPLE 11

A pipeline is cleaned, a protective coating is applied, and samples are tested as described in Example 1.

A second cleaning device is introduced to the pipeline and the interior between the two cleaning devices is filled with a corrosion promoter, such as an aqueous solution of phosphoric acid 15 mg/l concentration in terms of phosphorus content.

10 km of the pipeline length is occupied by this solution.

A pressure differential of 0.8 MPa is produced in the deposits.

Results of sample tests are represented in Table 4.

TABLE 4

| Example No. | Rate of corrosion formation in samples mm/yr | Life of the protective coating, days |
|---|---|---|
| 9 | 0.07 | 820 |
| 10 | 0.07 | 890 |
| 11 | 0.06 | 940 |

EXAMPLE 12

A pipeline is cleaned, a protective coating is applied, and samples are tested as described in Example 1.

A pressure differential of 0.8 MPa is developed in the deposits.

In contrast to the preceding examples, subsequent to the cleaning and coating operations ammonia in the amount of 0.3 mg/l is added to water conveyed along the pipeline during its regular operation.

Results of sample tests are represented in Table 5.

EXAMPLE 13

A pipeline is cleaned, coated, and samples are tested as described in Example 1.

A pressure differential of 0.8 MPa is produced in the deposits.

By contrast, during treatment of the protective coating in the course of pipeline operation with an aqueous solution of sodium polyphosphate, carbon dioxide in the amount of 3 mg/l is added thereto.

Results of sample tests are represented in Table 5.

EXAMPLE 14

A pipeline is cleaned, coated, and samples are tested for corrosion as described in Example 1.

This modified form of the proposed method differs from the preceding ones in that sodium polyphosphate used as the corrosion inhibitor producing the coating is subjected to partial depolymerization accompanied by the formation of polycompounds having not more than 6 atoms of phosphorus. For this purpose, the aqueous solution of sodium polyphosphate is passed through a condenser the casing of which is subjected to electric currents of alternating polarity.

Results of sample tests are represented in Table 5.

EXAMPLE 15

A pipeline is cleaned, coated, and samples are tested for corrosion as described in Example 1.

A pressure differential of 0.8 MPa is produced in the deposits.

By contrast, subsequent to cleaning and applying a protective coating, the coating is treated with an aqueous solution of sodium polyphosphate until iron content in water becomes less than 0.15 mg/l.

Thereafter, the treatment with sodium polyphosphate is terminated.

Results of sample tests are represented in Table 5.

TABLE 5

| Example No. | Rate of corrosion formation in samples, in mm/yr | Life of the protective coating, days |
|---|---|---|
| 12 | 0.05 | 980 |
| 13 | 0.04 | 1050 |
| 14 | 0.05 | 1200 |
| 15 | 0.04 | 1550 |

EXAMPLE 16

A pipeline is cleaned, coated and samples are tested for corrosion as described in Example 1.

The difference from the previously described modifications of the proposed method resides in that polyacrylamide of 50 mg/l in concentration is added to the aqueous solution of corrosion inhibitor pumped to the interior of the pipeline downstream of the cleaning device.

A pressure differential of 0.8 MPa is produced in the deposits.

The introduction of polyacrylamide is advantageous because it allows a 40 % decrease in the pressure of liquid after the cleaning device.

For producing a pressure differential of 0.8 MPa, a pressure on the order of 1.4 MPa must be developed in the pipeline interior after the pipe cleaning device. Addition of polyacrylamide makes it possible to bring this pressure down to 0.94 MPa.

EXAMPLE 17

A pipeline is cleaned, a protective coating is applied, and samples are tested for corrosion as described in Example 1.

In contrast to the previously described, an electric field of 10 mA/dm2 current density is induced at the wall of the pipeline.

A pressure differential of 0.8 MPa is maintained in the deposits.

The application of an electric field makes it possible to reduce the amount of corrosion inhibitor by 40 %, whereas the rate of corrosion formation in the samples is 0.04 mm/yr, and the life of the protective coating extends to 1850 days.

The proposed method can find application in meliorative, industrial, utility and drinking water supply systems, as well as in central heating pipelines and pipes used for feeding water to gas and oil wells. It can also be used both for reparing pipelines already in operation and protecting from corrosion pipelines under construction.

We claim:

1. A method for removing the deposits including corrosion products from the inner surface of a pipeline and applying a protective coating thereto, comprising the steps of treating the corrosion products with an agent capable of reducing their mechanical strength; cleaning the surface of the pipeline with high-speed jets of liquid which produce a differential pressure in the range of 0.2 to 1.25 Mpa.; and treating the inner surface of the pipeline with a corrosion inhibitor which reacts with the remaining deposits to form substantially insoluble compound which creates a protective coating on said pipeline inner surface.

2. A method as defined in claim 1, wherein said corrosion inhibitor is simultaneously dispensed with the liquid emanating from said high-speed jets.

3. A method as defined in claim 1, wherein said agent for reducing mechanical strength comprises an aqueous solution of chlorine in a 5 mg/l concentration.

4. A method as defined in claim 1, wherein said agent for reducing mechanical strength comprises an aqueous solution of aluminum sulfate in a 20 mg/l concentration.

5. A method as defined in claim 1, further comprising the step of treating the inner surface of the pipeline with a rust-converting agent prior to said cleaning step.

6. A method as defined in claim 5, wherein said rust-converting agent comprises a polyvinyl acetate dispersion.

7. A method as defined in claim 5, wherein said rust-converting agent comprises a methylvinylcerasin latex dispersion.

8. A method as defined in claim 1, further comprising the step of treating the remaining deposits with a corrosion-promoting solution subsequent to said cleaning step, but prior to said step of treating with a corrosion inhibitor.

9. A method as defined in claim 8, wherein said corrosion-promoting solution is selected from the following group: an aqueous solution of chlorine, phosphoric acid or aluminum sulfate.

10. A method as defined in claim 1, wherein said cleaning step includes adding polyacrylamide in the range of 2 to 100 mg/l to the liquid emitted by the jets.

11. A method as defined in claim 1, wherein said corrosion inhibitor comprises an aqueous solution selected from the following group: sodium polyphosphate of 0.5 to 3.5 mg/l concentration in terms of $P_2O_5$, or with an aqueous solution of aluminum alloy of the following composition, in weight, percent: magnesium 0.1 to 1.0 gallium 0.1 to 3.5, aluminum-the balance, or with an aqueous solution of sodium polyphosphate, sodium silicate and phosphoric acid in a ratio of 2:1:1, respectively, or with an aqueous solution of polyphosphate and sodium silicate in a ratio of 10:1, or with an aqueous solution of cement.

12. A method as defined in claim 1, wherein said corrosion inhibitor includes an aqueous solution of sodium polyphosphate in a maximum concentration of 3.5 mg/l, the sodium polyphosphate being partially depolymerized to form polycompounds having not more than 6 phosphorus atoms.

13. A method as defined in claim 1, wherein said corrosion inhibitor includes a mixture of an aqueous solution of sodium polyphosphate in a maximum concentration of 0.03 mg/l with ammonia in a 3 mg/l concentration.

14. A method as defined in claim 1, wherein said corrosion inhibitor includes a mixture of an aqueous solution of sodium polyphosphate in a maximum concentration of 3 mg/l with carbon dioxide in a 3 mg/l concentration.

15. A method as defined in claim 1, wherein said step of treating said corrosion inhibitor includes the step of forming a coating having an iron content of 0.1 to 0.15 mg/l in water at the outlet of the pipeline.

* * * * *